(12) United States Patent
Sebesta et al.

(10) Patent No.: US 6,324,681 B1
(45) Date of Patent: Nov. 27, 2001

(54) AUTOMATED DEVELOPMENT SYSTEM FOR DEVELOPING APPLICATIONS THAT INTERFACE WITH BOTH DISTRIBUTED COMPONENT OBJECT MODEL (DCOM) AND ENTERPRISE SERVER ENVIRONMENTS

(75) Inventors: James S. Sebesta, Champlin; Joey L. Erickson, New Brighton; David R. Johnson, Oakdale, all of MN (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 09/164,908

(22) Filed: Oct. 1, 1998

(51) Int. Cl.[7] .................................................. G06F 9/45
(52) U.S. Cl. ................................. 717/1; 717/5; 707/10; 709/203
(58) Field of Search ....................... 717/1, 2, 5; 709/101; 707/10, 6, 205

(56) References Cited

U.S. PATENT DOCUMENTS

| | | | |
|---|---|---|---|
| 4,901,231 | * 2/1990 | Bishop et al. | 707/205 |
| 4,949,253 | * 8/1990 | Chigira et al. | 717/2 |
| 5,075,847 | * 12/1991 | Fromme | 717/5 |
| 5,428,782 | * 6/1995 | White | 709/101 |
| 5,724,424 | 3/1998 | Gifford | 705/79 |
| 5,754,772 | * 5/1998 | Leaf | 709/203 |
| 6,078,918 | * 6/2000 | Allen et al. | 707/6 |
| 6,115,710 | * 9/2000 | White | 707/10 |
| 6,212,546 | * 4/2001 | Starkovich et al. | 709/203 |

OTHER PUBLICATIONS

Jon G. Auerbach, "Open Market Inc. Says It Will Receive Patents for Internet–Commerce Software," *Wall Street Journal*, Mar. 3, 1998, p. 36.

* cited by examiner

Primary Examiner—Tuan Q. Dam
Assistant Examiner—Hoang-Vu Antony Nguyen-Ba
(74) Attorney, Agent, or Firm—Charles A. Johnson; Mark T. Starr; Nawrocki, Rooney & Sivertson, P.A.

(57) ABSTRACT

An automated development system which allows developers to more easily incorporate functionality from enterprise-based On-Line Transaction Processing (OLTP) services within an application running on a DCOM-based platform. View files (which describe how parameters will be provided to and received from an OLTP service) are transferred from the enterprise OLTP system to a DCOM environment. These view files and an associated set of interactively supplied user parameters are provided as input to a function builder utility (DGateAce) which generates function files and Interface Definition Language files as output. These output files simplify the creation of DCOM Client and Server modules which enable a DCOM application to communicate directly with an enterprise OLTP service

31 Claims, 7 Drawing Sheets

AUTOMATED DEVELOPMENT SYSTEM FOR DEVELOPING APPLICATIONS THAT INTERFACE WITH BOTH DISTRIBUTED COMPONENT OBJECT MODEL (DCOM) AND ENTERPRISE SERVER ENVIRONMENTS

CROSS REFERENCE TO CO-PENDING APPLICATIONS

The present application is related to U.S. patent application Ser. No. 09/164,932, filed Oct. 1, 1988, entitled "A MULTI-CLIENT USER CUSTOMIZED DCOM GATEWAY FOR AN OLTP ENTERPRISE SERVER APPLICATION", and application Ser. No. 09/164,759, filed Oct. 1, 1998, entitled "A COMMON GATEWAY WHICH ALLOWS APPLETS TO MAKE PROGRAM CALLS TO OLTP APPLICATIONS EXECUTING ON AN ENTERPRISE SERVER", both of which are assigned to the assignee of the present invention and incorporated herein by reference.

BACKGROUND OF THE INVENTION

1. Field of the Invention

The present invention relates to a communications gateway for providing access to an enterprise server application from a Distributed Component Object Model (DCOM) environment, and more specifically, to a gateway utility which provides an interactive interface to simplify the building of functions to access an enterprise On-Line Transaction Processing (OLTP) application from a DCOM environment.

2. Description of the Prior Art

The methods by which companies conduct business with their customers are undergoing fundamental changes, due in large part to World Wide Web technology. In addition, the same technology that makes a company accessible to the world, may be used on internal company networks for conducting operational and administrative tasks.

One of the technologies underlying the World Wide Web is the Web Browser. Web Browsers have become a de facto user interface standard because of their ability to interpret and display information having standard formats (e.g., HyperText Markup Language (HTML), standard test, GIF, etc.). Client software programs, popularly referred to as Web Browsers (e.g., Mosaic, Netscape Navigator, Microsoft Internet Explorer, etc.), execute on client systems and issue requests to server systems. The server systems typically execute HyperText Transport Protocol (HTTP) server programs which process requests from the Web Browsers and deliver data to them. The system that executes an HTTP server program and returns data to the Web Browser will hereinafter be referred to as a Web Server System. An HTTP server program itself will be referred to as a Web Server.

A Web Server System has access to on-line documents that contain data written in HyperText Markup Language (HTML). The HTML documents contain display parameters, capable of interpretation by a Web Browser, and references to other HTML documents and Web Servers (source: World Wide Web: Beneath the Surf, from UCL Press, by Mark Handley and Jon Crowcroft, on-line at http://www.cs.ucl.ac.uk/staff/jon/book/book.html).

As Web Browsers are making their mark as a "standard" user interface, many businesses have a wealth of information that is managed by prior art data base management systems such as DMS, RDMS, DB2, Oracle, Ingres, Sybase, Informix, and many others. In addition, many of the database management systems are available as resources in a larger transaction processing system. There are also mission critical applications which still reside on enterprise servers, since these type of systems have resiliency and recovery features historically not available on other smaller types of servers.

One key to the future success of a business may lie in its ability to capitalize on the growing prevalence of Web Browsers in combination with selectively providing access to the data that is stored in its databases. Common Gateway Interface programs are used to provide Web Browser access to such databases.

The Common Gateway Interface (CGI) is a standard for interfacing external applications, such as Web Browsers, to obtain information from information servers, such as Web Servers. The CGI allows programs (CGI programs) to be referenced by a Web Browser and executed on the Web Server system. For example, to make a UNIX database accessible via the World Wide Web, a CGI program is executed on the Web Server system to transmit information to the database engine, receive the results from the database engine, and format the data in an HTML document which is returned to the Web Browser.

A disadvantage with the CGI program approach described above is that the application developer must be intimately acquainted with the HTML, the CGI, and the database engine. In addition, a different CGI program may be required for each different database, thus adding to the cost of creating and maintaining the database access for the Web Browser. Thus, the application developer is required to understand multiple types of systems, and must also understand how these systems interface. The learning curve for this type of development is therefore undesirably long.

SUMMARY OF THE INVENTION

The present invention overcomes many of the disadvantages associated with the prior art by providing a utility with an interactive interface that simplifies building transaction gateway functions to access an enterprise server based On-Line Transaction Processing (OLTP) application from a Distributed Component Object Model (DCOM) environment. Thus, the automated development system of the present invention allows developers to more easily incorporate functionality from enterprise-based applications within an application running on a DCOM-based platform.

In order to utilize the present invention, a developer must first create a service on the enterprise server. An example of a service may be retrieval of data from a database associated with the enterprise On-Line Transaction Processing (OLTP) system. After the service has been developed, the developer transfers the service input and output "view files" to a location where they can be accessed by the DGateAce utility of the present invention. In a preferred embodiment, this location is a Windows NT workstation. The "view files" contain a description of the parameters used for transaction requests and responses. In other words, the input view file includes information on what the input parameters are and how they must be formatted for the service, and the output view file includes information on what the output parameters are and how they are formatted by the service to the external user. A single view file could be used for both the input and output parameters for a transaction, separate view files could be used for both input and output parameters, or a single view file could be used for only input parameters.

Upon invocation, the DGateAce utility extracts the interface information from the view files and automatically generates a source file that is compatible with the DCOM environment. This source file is subsequently used in the creation of a DCOM Server. During the source file generation process, the DGateAce utility queries the user for the type of client(s) that will be using the Server so that the Server is tailored for receiving requests from those types of Clients. These Clients may include Visual Basic, C++, Web Browsers with Active Server Pages (ASPs), or other types of Client applications. After the DCOM Server has been successfully generated, the developer must then develop an application (Client) running within the DCOM environment. When a standard call is made from a DCOM Client application to an enterprise-based On-Line Transaction Processing service, the following steps will occur: First, the request will pass from the DCOM Client to the DCOM Server. The Server will correctly format (pack) the request parameters, and pass the request onto the DGate_Server.dll Dynamic Link Library (DLL). The Dynamic Link Library (DLL), verifies that the input parameters can be read, and verifies that the output parameters can be written. The DLL then appends required additional parameters to the request and forwards the request to the DGate.Exe (the DCOM Gateway) component. This DCOM Gateway executable uses parameter information to correctly forward the request to the OLTP service on the enterprise system. The requested service is performed on the enterprise system, and a response is sent back to the DCOM Gateway executable (DGate.Exe). The DCOM Gateway executable checks for successful completion by the OLTP service, then passes the response to the Server, which correctly formats (unpacks) the data and passes it back to the requesting Client application.

In this manner, a C, C++, Visual Basic, or some other type of application running on an NT or Windows system is provided access to user-developed services running on an enterprise server. The developer does not need to understand the interface between the two systems because this information is automatically included within the automatically-generated interface software components.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENTS

The detailed descriptions which follow are presented largely in terms of algorithms and symbolic representations of operations on data bits within a computer memory. These algorithmic descriptions and representations are the means used by those skilled in the data processing arts to most effectively convey the substance of their work to others skilled in the art.

An algorithm is here, generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers or the like. It should be kept in mind, however, that all of these and similar terms are to be associated with the appropriate physical quantities and are merely convenient labels applied to these quantities.

Furthermore, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operations of the present invention include general purpose digital computers or other similar devices. In all cases, it should be kept in mind the distinction between the method operations in operating a computer and the method of computation itself. The present invention related to method steps for operating a computer in processing electrical or other (e.g., mechanical, chemical) physical signals to generate other desired physical signals.

The present invention also relates to apparatus for performing these operations. This apparatus may be specially constructed for the required purposes or it may comprise a general purpose computer as selectively activated or reconfigured by a computer program stored in the computer. The algorithms present herein are not inherently related to a particular computer system or other apparatus. In particular, various general purpose computer systems may be used with computer programs written in accordance with the teachings of the present invention, or it may prove more convenient to construct more specialized apparatus, to perform the required method steps. The required structure for such machines will be apparent from the description given below.

Figure 1:
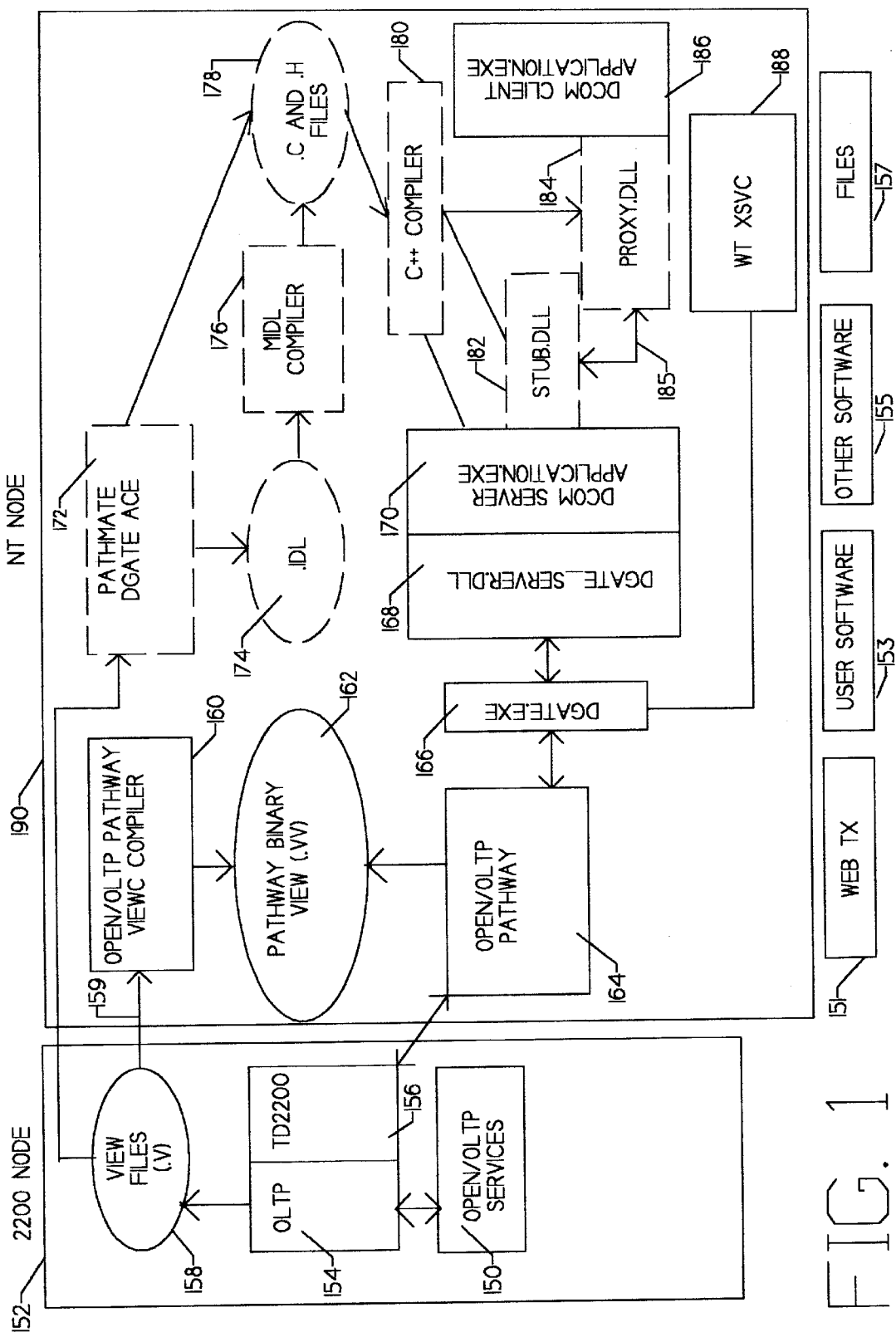
FIG. 1 is an illustration of the environment within which the present invention operates.

FIG. 1 is an illustration of the environment within which the present invention operates. As described in more detail below, the present invention is an automated development system which simplifies the creation of DCOM Client/Server components which interface an application running under the DCOM environment with an enterprise based On-Line Transaction Processing (OLTP) service. The present invention is specifically developed to operate in the DGate environment described in a co-pending application entitled, "A MULTI-CLIENT USER CUSTOMIZED DCOM GATEWAY FOR AN OLTP ENTERPRISE SERVER APPLICATION", which is hereby incorporated by reference.

Open/OLTP services 150 are created by a user on an enterprise server 152, such as a Unisys 2200. These services 150 are capable of operating under an OLTP-style transaction processing system. In a preferred embodiment, this OLTP-style system is X/Open compliant. The service 150 is designed to accomplish a specific task, for example, update a user's bank account balance following a debit or credit.

Each service is associated with an input view (.v) file 158 which defines how the input parameters will be provided to the service 150. In particular, the .v file 158 indicates where each input parameter is located in the view file, and the size and type of each input parameter. If a service 150 is to provide output to the user (for example, the updated account balance), another output view file is required to communicate how the information will be presented within the output view buffer.

For all services 150 that are to accessed from a particular Windows NT node 190, the associated view files 158 must be copied (via FTP or other copy service, shown at 159) to that node 190. Once the view files 158 have been successfully copied to the Windows NT node 190, the ViewC compiler 160 is used to generate ".vv" files 162.

The PathMate DGateAce software component of the present invention also must have access to the view files 158. DGateAce 172 uses the view files 158 to automatically generate files needed for an application to operate within a DCOM environment. These files include the DCOM Server Applcation.exe 170, the Stub.dll 182, and the Proxy.dll 184.

The Distributed Component Object Model (DCOM) is a Microsoft model for distributed object computing. Within the DCOM environment, a remote DCOM Client Application 186 can make a request. The DCOM client 186 can be any type of client, including a Visual Basic client, a C++ client, or a Web Browser with Active Server Pages (ASP). If the request made by the DCOM client 186 is a request for access to a remote process (interprocess request) the request is routed to proxy.dll 184. Proxy.dll 184 is a code segment which receives any client requests targeted for a remote server, and will facilitate the necessary interprocess communications. The proxy.dll 184 understands how to communicate with the Client 186, and also understands how to communicate over an interface 185 which is shared by two or more processes. The proxy.dll 184 "marshals" the request parameters into an independent format so that they may be provided by the client process 186 over the COM-based interface 185, which conforms with the Microsoft DCOM Model. The stub.dll 182, which also understands how to communicate over the common interface 185, "unmarshals" the parameters into a format that can be understood by the DCOM Server Application.exe 170. Thus, the DCOM environment allows machines with entirely different architectures (PCs, Workstations, etc.) to communicate using a common interface.

The specifics of the common interface are described in an Interface Definition Language (IDL) 174. The IDL 174 is operated on by the Microsoft Interface Definition Language (MIDL) compiler 176 to create a set of .c (C) and .h (header) files 178. Then, a second compiler (C++) 180 operates on the .c and .h files to create the stub.dll 182 the proxy.dll 184, and the DCQM Server Application executable (.exe) 170. The proxy.dll 184 is linked to the DCOM Client Application executable (.exe) 186, and the stub.dll 182 is linked to the DCOM Server Application executable (.exe) 170.

Once the stub.dll 182 un-marshals the parameters, the parameters are packaged into a single buffer by DCOM Server Application executable (.exe) 170 and passed to the DGate-Server.dll 168. The DGate-Server.dll 168 and the DGate.exe 166 are the modules which "DCOM-enable" an OLTP enterprise server 152 such as the Unisys 2200 System.

Figure 2:
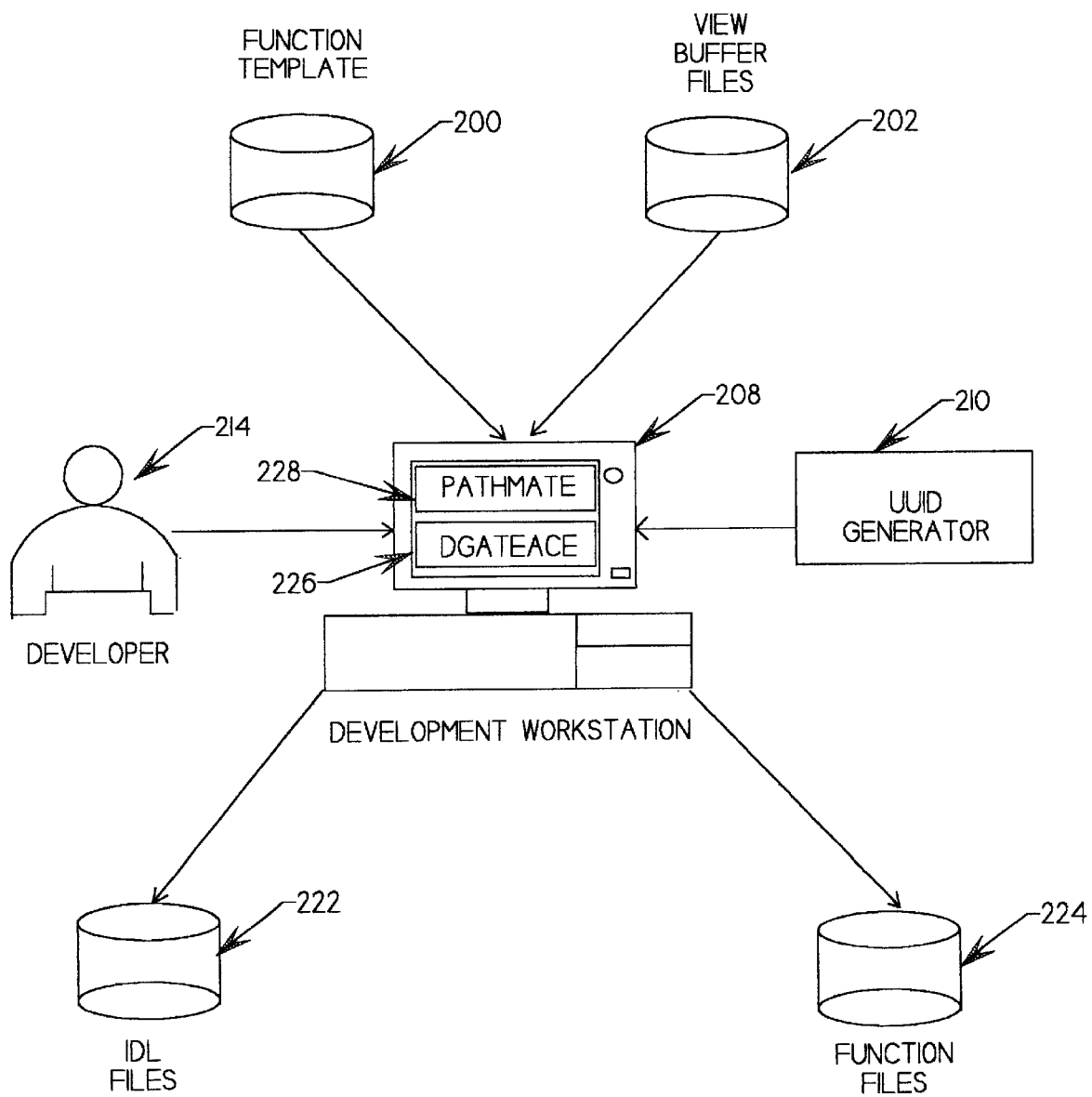
FIG. 2 is a high-level, generalized diagram showing inputs to and outputs from the function building tool (DGateAce) of the present invention.

FIG. 2 is a high-level, generalized diagram showing inputs to and outputs from the function building tool (DGateAce) of the present invention. The DGateAce tool 226 is a transaction gateway utility that provides an interactive interface which simplifies the building of functions within a Distributed Component object Model (DCOM) environment for accessing an enterprise based On-Line Transaction Processing service. The DGateAce tool 226 can run on any platform that supports the Microsoft Windows 95 or Microsoft Windows NT environment and has access to files containing VIEW buffers for the transactions that are going to be converted. DGateAce 226 receives input from four sources: a function template 200, one or more view buffer files 202, a universal unique identifier from a UUID generator 210, and a set of interactively entered information generated by an application developer 214. From these four input sources, DGateAce produces two types of output: interface definition language (IDL) files 222, and function files 224.

One of the tasks when developing an enterprise based Open/OLTP service is defining view buffer files 202. A view buffer file 202 is a description of the parameters used for transaction requests and responses. A single view buffer file 202 could be used for both the input and output parameters for a transaction, or separate view buffer files 202 could be used for input and output.

The DGateAce tool of the present invention uses the Open/OLTP view buffer files (.v) 202 to allow developers to select the views they want to use when defining the functions for a given DCOM server program. Therefore, these view buffer files must be accessible from the workstation 208 where PathMate 228 is installed, either on a local drive or on a network drive accessible from the PathMate workstation 208.

DCOM requires that each interface have a universal unique identifier (UUID). DGateAce 226 can use its UUID-GEN utility 210 to generate and insert a UUID for an interface with the click of a button. If the Open/OLTP Pathway is not installed, a UUID does not have to be entered in DGateAce 226, but can be manually entered later in the IDL file 222, before compilation.

DGateAce 226 also requires a function template 200, such as the one provided with DGateAce 226, which provides DGateAce 226 with a generalized framework for the generation of an output function file 224. A customized function template can be used in place of the template provided by DGateAce 226.

Finally, DGateAce 226 requires a set of information which is interactively provided by an application developer 214 during the DGateAce 226 generation process. This set of information includes interface names and function names.

As mentioned earlier, the DGateAce tool 226 will produce Interface Definition Language (IDL) files 222 as output. These IDL files 222 are source files defining the interface for a DCOM application. After generation of the IDL files 222 by the DGateAce tool 226, the IDL files are compiled to produce a proxy/stub source file used by the DCOM Client/Server application, a UUID source file, and a set of header files.

The DGateAce tool 226 also produces function files 224 as output from its generation process. These function files 224 server as source files for modules of the DCOM Server application. There is typically one function file 224 generated for each unique combination of Open/OLTP service name, input view buffer, and output view buffer.

Figure 3:
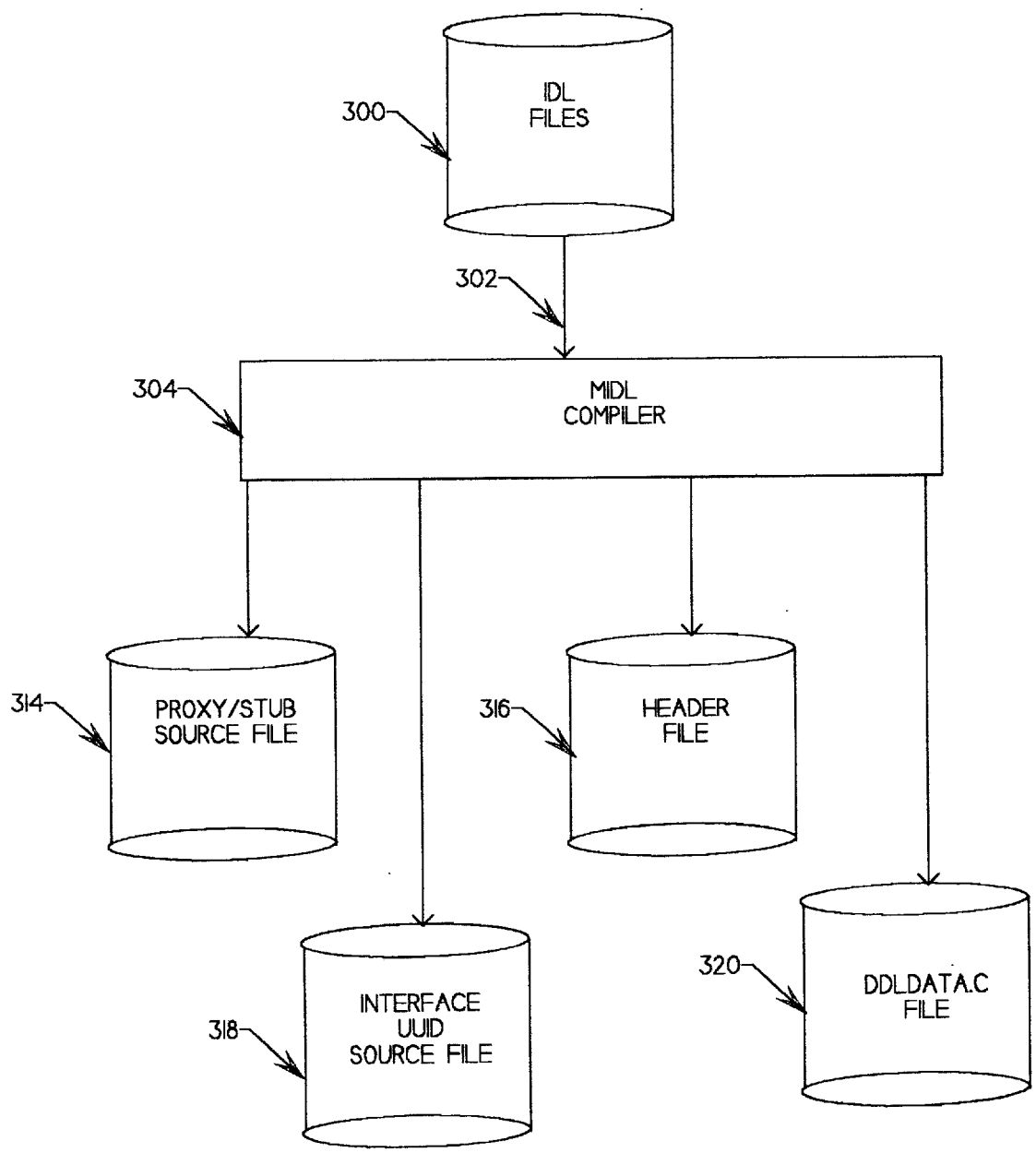
FIG. 3 illustrates how Interface Definition Language (IDL) files generated by the function building tool of the present invention (DGateAce) are compiled by the Microsoft IDL compiler.

FIG. 3 illustrates how Interface Definition Language (IDL) files generated by the function building tool of the present invention (DGateAce) are compiled by the Microsoft IDL compiler. As described previously in FIG. 2, DGateAce 226 produces two types of output files: function files and Interface Definition Language (IDL) files 300. Interface Definition Language (IDL) files 300 are source files which define the interface for the DCQM application.

After generation of the IDL files 300 by the DGateAce utility, the IDL files are provided as input through interface 302 to a Microsoft Interface Definition Language (MIDL) compiler 304, which must be installed on the development workstation. The MIDL compiler 304 is included as part of the Microsoft Windows Software Development Kit (SDK). The MIDL compiler 304 produces four types of output files. The first type of output file is the proxy/stub source file 314. The proxy/stub source file 314 includes a proxy function for the DCOM client and a stub function for the DCOM Server. The second type of output file is an interface UUID source file 318. An interface UUID source file 318 provides UUIDs for the DCOM client program. The third type of output file produced by the MIDL compiler 304 is a header file 316. The header file (.h) 316 is used in the compilation of the DCOM Client and Server source code. Finally, the last file produced by the MIDL compiler 304 is a dldata.c file 320. The dldata.c file 320 provides the proxy/stub with entry-point information.

Figure 4:
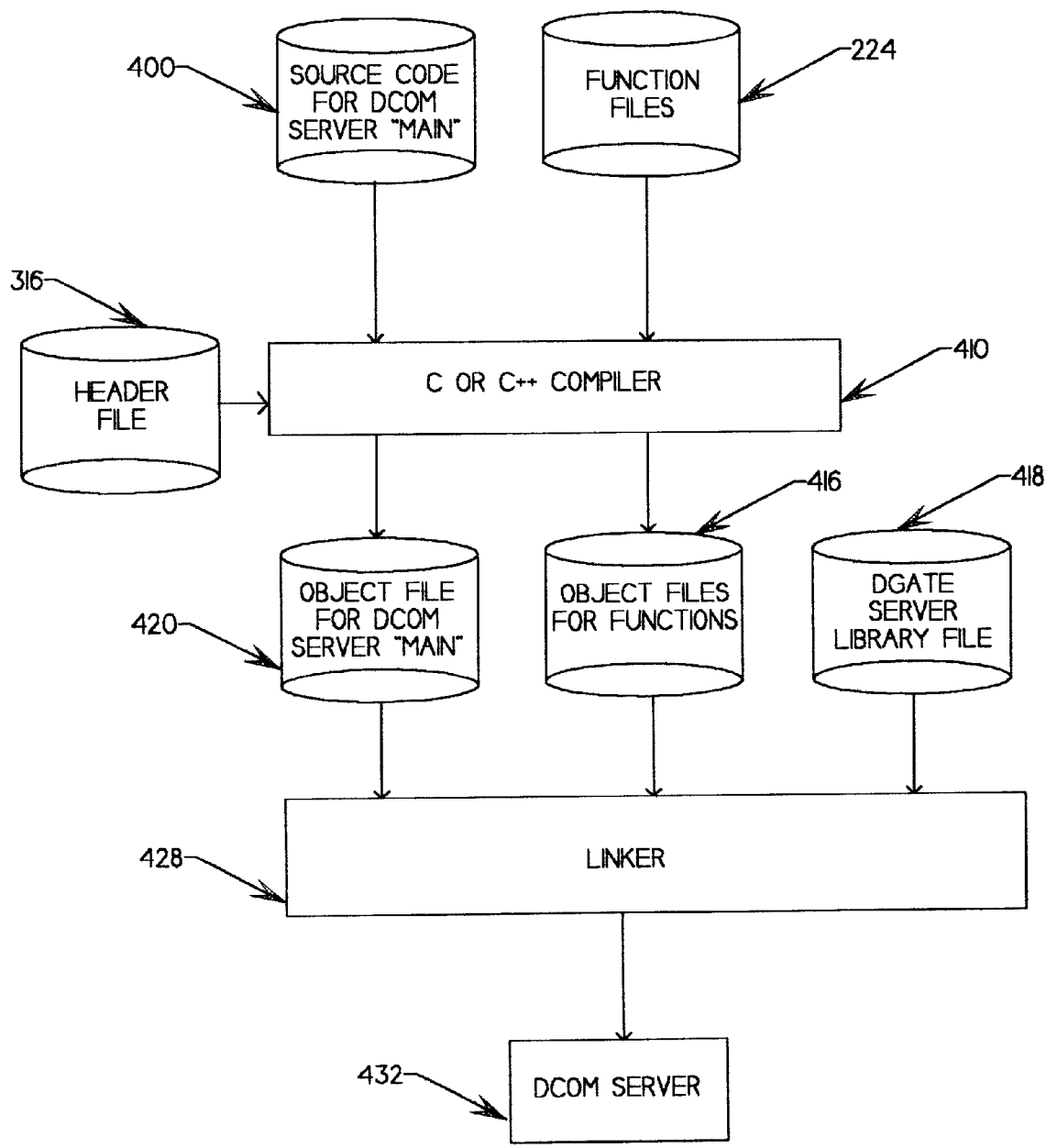
FIG. 4 illustrates how the output files from the function building tool (DGateAce) of the present invention are used during the compilation and linking of the DCOM Server module.

FIG. 4 illustrates how the output files from the function building tool (DGateAce) of the present invention are used during the compilation and linking of the DCOM Server module 432. In order to successfully compile and link the components of the DCOM Server 432, a C or C++ compiler 410 and object linker 428 must be installed on the development workstation. There are three major input components provided to the C or C++ Compiler 410: 1) source code for the main program of the DCOM server application, written by the developer 400, 2) the function files 224 produced by the DGateAce tool, as shown in FIG. 2, and 3) The header file 316 produced by the MIDL compiler, as shown in FIG. 3. The outputs of the C or C++ Compiler 410 are an object file (.obj) for the main program 420 and a set of object files (.obj) for the functions 416. These two object files 420 and 416 are then linked with the DGate Server library file (DGate_Server.lib) 418 through the linker module 428 to create the DCOM Server executable program 432.

Figure 5:
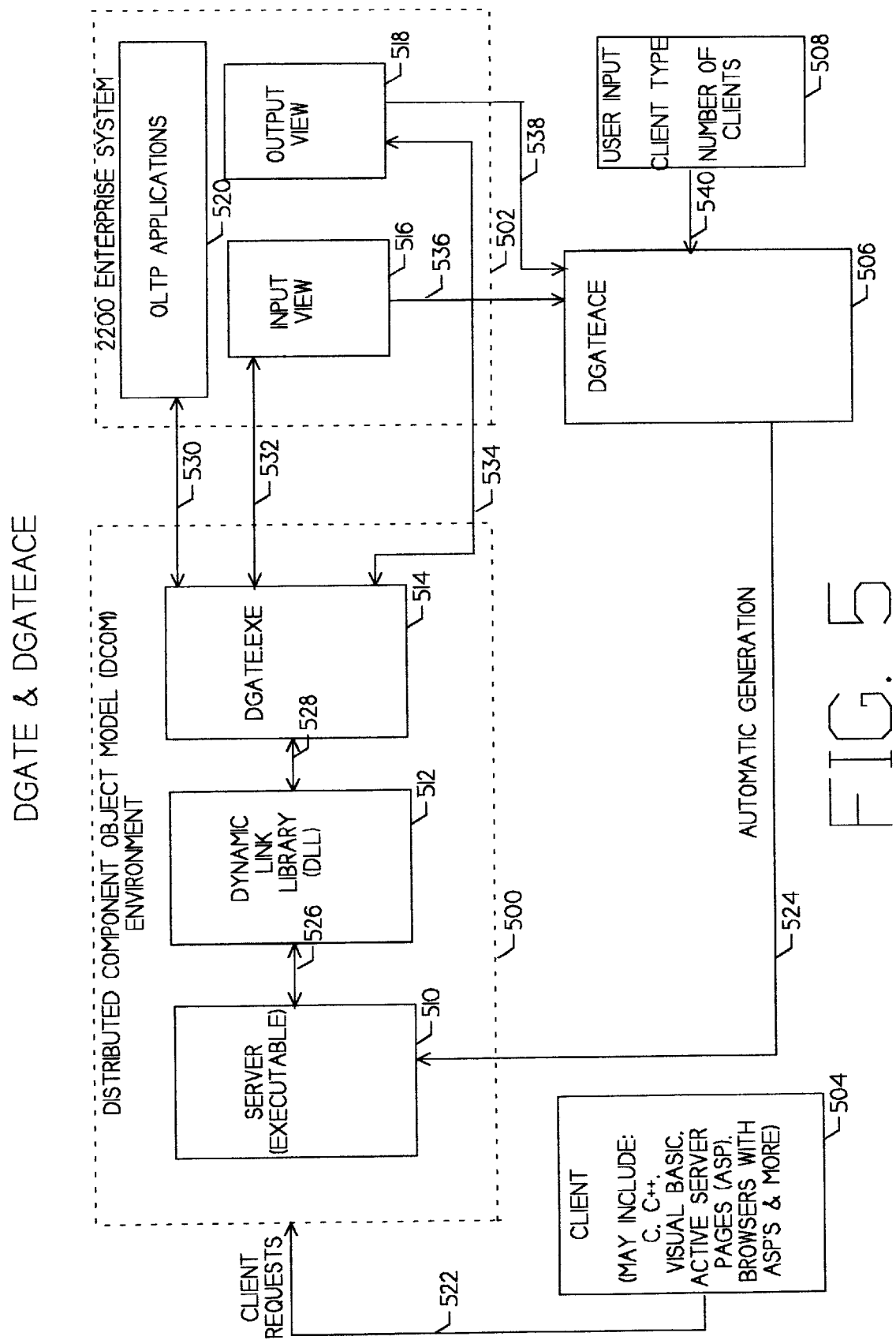
FIG. 5 is a diagram which indicates the interrelationships between the DGate gateway and DGateAce tool.

FIG. 5 is a diagram which indicates the interrelationships between the DGate gateway and DGateAce tool. The automated development system the of present invention allows developers to develop applications, or "services", on an enterprise server. In this case, OLTP applications are developed on a Unisys 2200 enterprise system 502. Ideally, these applications will be available to end users executing within a DCOM environment 500.

Under the development system of the present invention, a developer must still understand how to create a service on the enterprise system 502. An example of a service may be retrieval of data from a database associated with the 2200 enterprise On-Line Transaction Processing System (OLTP) 520.

After a developer has completed development of a service 520 on the Unisys 2200 system 502, the developer transfers the service input 516 and/or output view files 518 to a locations where they can be accessed by the DGateAce tool 506. The view files 516 and 518 define how the input parameters will be provided to the service. In particular, the view files 516 and 518 indicate where each input/output parameter is located, and the size and type of each input/output parameter.

After the input and output view files 516 and 518 have been transferred to a location where DGateAce 506 can operate on them, DGateAce 506 extracts the interface information from the view files 516 and 518 and automatically generates a source file that is compatible with the DCOM environment 500. This executable file is shown in FIG. 5 as the DCOM Server 510. During the generation process, DGateAce 506 queries the user 508 for the type of Client(s) 504 which will be using the Server 510 so that the Server 510 is tailored for receiving requests from those types of Clients 504. These Clients 504 may include Visual Basic, C++, and/or Web Browsers with Active Server Pages (ASPs).

The developer must next develop the application (Client) 504 running within the DCOM environment which generates the request. This application (Client) 504 will include a standard call 522 to the Server 510.

When a standard call 522 is made from an application 504 running under DCOM to the DCOM Server 510, the Server 510 will correctly format (pack) the request parameters, and pass the formatted parameters via interface 526 to the DGate_Server.dll Dynamic Link Library (DLL) 512. The DLL 512 verifies that the input parameters can be read, and verifies that the output parameters can be written. The DLL 512 then appends additional parameters to the request and forwards the request to the DGate.exe component 514 via interface 528. DGate.exe 514 uses parameter information to correctly forward the request to the 2200 enterprise system 502. The requested service 520 is performed on the 2200 enterprise system 502, and a response is sent back to Dgate.exe 514 via interface 532. DGate.exe checks for time out or disconnect conditions and returns the service response via interface 528 to the DGate_Server.dll 512. The DGate_Server.dll 512 checks for successful completion of the operation and passes the response to the Server 526 via interface 526. The Server 526 checks completion codes and passes the response to the requesting client 504 via interface 522.

In this manner, a C, C++, Visual Basic, or some other type of application 504 running on a Microsoft Windows NT or Microsoft Windows 95 system is provided access to user-developed services 520 running on an enterprise server 502. The developer does not need to understand the interface between the two systems 500 and 502 because this information is automatically included within the automatically-generated interface software components.

Figure 6:
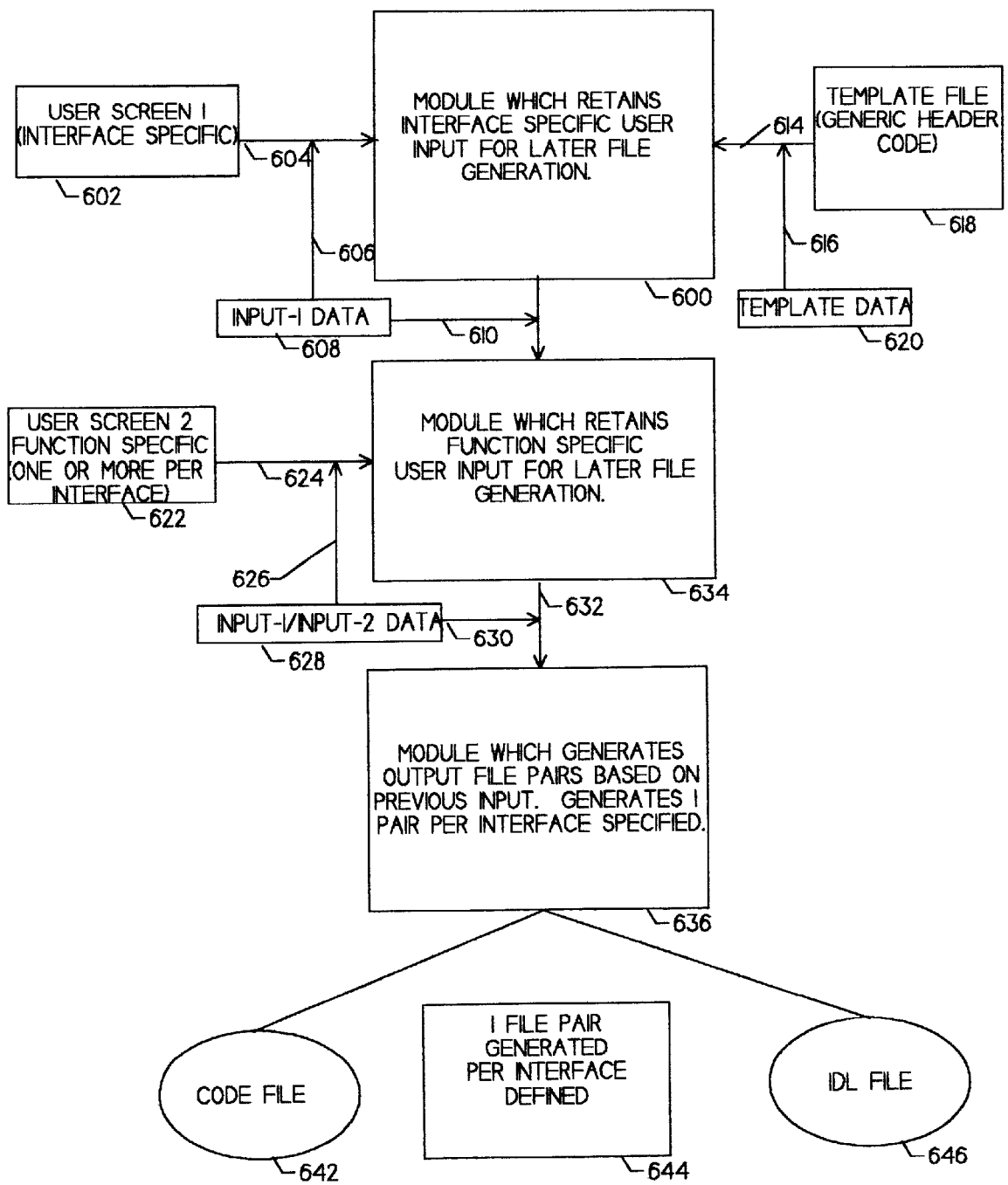
FIG. 6 is a generalized flow diagram of the process flow of the function building tool (DGateAce)

FIG. 6 is a generalized flow diagram of the process flow of the function building tool (DGateAce). After the DGateAce tool starts, it first displays a DGateAce: DCOM Interface Definition Form 602. This form 602 is used to set up an interface definition for the Server. A user will supply data 608 for this form by providing the following types of information: IDL header information, gateway name, interface name, transaction type, data type, and selection of a template file 618. This user supplied input data 608 is passed onto both the module which retains interface user input for later file generation 600, and the module which retains function specific user input for later file generation 634. When the user selects a template file 618, the template file 618 is also passed onto the module which retains interface specific user input for later file generation 600, along with any appropriate template data 620.

Upon completion of the interface specific user screen 602, the DGateAce tool advances to the DGateAce: DCOM Function Definitions form 622. This form 622 is used to build functions for the interface. On this form a developer is queried to input the required service name for the transaction to be translated to DCOM/OLE. The developer is also prompted for the input and output (optional) view file locations, and the OLTP input and output views the developer wants included in the function. Finally, the developer is asked to provide select function-based attributes. A developer provides this input data 628 to the module which retains function specific user input for later file generation 634. Information may also be passed to the module which retains function specific user input for later file generation 634 from the module which retains interface specific user input for later file generation 600.

Upon completion of processing of the interface specific and function specific input data, control next passes to a module which generations output file pairs based on the user provided input 636 via interface 632. This module 636 will generate one pair of output files for each interface specified 644. The pair of output files includes a code (functions) file 642 and an Interface Definition Language (IDL) file 646.

Figure 7:
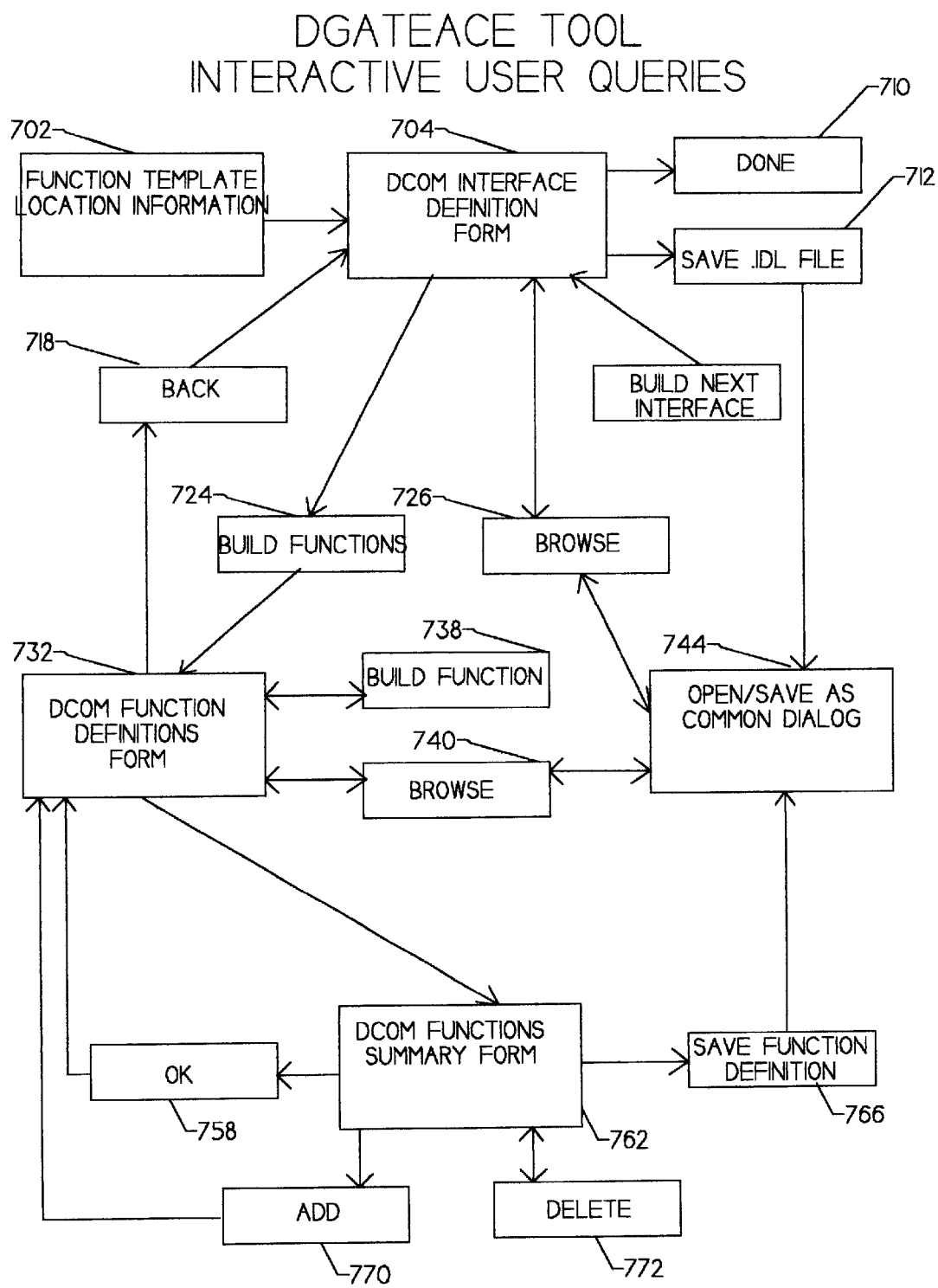
FIG. 7 is a detailed flow diagram of the process flow of the function building tool (DGateAce), which specifically shows interrelationship between interactive user queries and the function definition.

FIG. 7 is a detailed flow diagram of the process flow of the function building tool (DGateAce), which specifically shows interrelationship between interactive user queries and the function definition. The DGateAce tool behaves like a wizard, prompting the developer for information it needs to build base server source code files or modules that call TransIT Open/OLTP transactions. The DGateAce tool prompts the developer through three data input forms: a DCOM Interface Definition form 704, a Function Definitions form 732, and a DCOM Functions Summary form 762. The DGateAce tool creates and saves Interface Definition Language (IDL) files 712 and function definition files 766. These files are the basis for the DCOM Client and Server code modules access by the DGate feature in the WebTX product. The DGate feature is packaged with the WebTX product as part of the Integrated Operating Environment (IOE) and is installed on the Windows NT node of a Unisys ClearPath IX Server. The DGateAce tool is packaged with the PathMate product as a solution.

In order to successfully run the DGateAce utility, the utility needs access to certain files locally or through network connections to a workstation. A developer must specify the location of the OLTP view buffers, otherwise known as "view files" (not shown), specify the location of any custom function templates 702 associated with the client/server function code files, and be able to save the DGateAce generated IDL files and function definition files 712 and 766.

After starting the DGateAce tool, a user is first presented with a DCOM interface definition form 704. This form will prompt the user to enter IDL header information, a gateway name, interface name, transaction type, data type, and a template file. Upon completion of the interface definition form 704, a user is presented with several choices. The user may choose to exit the tool 710, without saving any of the information. The user may decide to utilize the browse function 726 from the "open/save as common dialog" 744 to select a function template file. The user can also choose to save the IDL file 712 via the open/save as common dialog 744. Finally, a user may wish to proceed to the next step in the definition process, namely building functions 724. If a user chooses to continue to the build functions 724 portion of the DGateAce tool, the developer is next presented with the DCOM Function Definitions form 732. On this form 732 the developer is prompted to input the required OLTP service name for the transaction to be translated to DCOM/OLE, to select input and output view file locations, to choose the OLTP input and output views that are to be included in the function, and to select function-based attributes. The user may choose browse 740 to select input and output view files via the "open/save as common dialog" 744.

Once the user has provided the necessary input to the DCOM function definitions form 732, the user may build the function 738. A developer advances to the DCOM Functions Summary form 762 when the developer clicks the build function 738 pushbutton and answers "NO" to a message asking if the developer wishes to build another function on the DCOM Function Definitions Form 732. From within the DCOM Functions Summary Form 762, a developer may return to the DCOM Function Definitions Form 732 by choosing the "OK" pushbutton 758, display all of the functions defined for the current function file in a list box, "ADD" 770 or "DELETE" 772 the individual functions created by the DGateAce tool, or save the function definition 766 via the "open/save as common dialog" 744. By clicking the "ADD" pushbutton 770, the process flow will return to the DCOM Function Definitions Form 732, so that the developer can create another function for the current function file.

In order to verify that the DGateAce tool successfully wrote the interface definition and function definition files, the developer may open Explorer under Microsoft Windows 95 to see that the Interface Definition Language (IDL) files and source code (.c) files exist in the appropriate directory and file name locations, and may also verify that the date and time stamps on the files are current. To verify that the DGateAce tool generated the proper code, the Interface Definition Language (IDL) code can be used as a function prototype for the C++ wizard and the source files (.c) should successfully compile with the C/C++ compiler.

Having thus described the preferred embodiments of the present invention, those of skill in the art will readily appreciate that the teachings found herein may be applied to yet other embodiments within the scope of the claims hereto attached.

What is claimed is:

1. In a data processing system having a Distributed Component Object Module (DCOM) environment connected to an enterprise On-Line Transaction Processing (OLTP) system, the improvement comprising:

means coupled to said DCOM environment for building a set of functions which allow an application residing within said DCOM environment to access an associated service on said On-Line Transaction Processing (OLTP) system;

wherein an application residing on said enterprise On-Line Transaction Processing (OLTP) system has an associated set of input and output view files which define how parameters will be provided to and received from said OLTP system;

wherein said view files indicate where each said parameter is located in the view file, and the size and type of each said parameter; and wherein said view files are copied from said enterprise OLTP system to said DCOM environment prior to invocation of said function building means.

2. A data processing system according to claim 1 wherein said function building means extracts interface information from said view file and generates a set of source files which is compatible with said DCOM environment.

3. A data processing system according to claim 2 wherein during said generation of said source files, a user is queried about a type of client that will be using said source files, thereby allowing said source files to be specifically tailored to receive requests from the type of client specified by the user.

4. A data processing system according to claim 3 wherein said set of generated source files includes Interface Definition Language (IDL) files which define an interface for a DCOM Client application.

5. A data processing system according to claim 4 wherein said IDL files are compiled by a Microsoft Interface Definition Language (MIDL) compiler, which produces a set of MIDL output files.

6. A data processing system according to claim 5 wherein said set of MIDL output files includes at least one proxy/stub source file that has a proxy function for use with said DCOM Client application, and a stub function for use with a DCOM Server.

7. A data processing system according to claim 5 wherein said set of MIDL output files includes an interface Universal Unique Identifier (UUID) source file that provides UUIDs for said DCOM Client application.

8. A data processing system according to claim 5 wherein said set of MIDL output files includes at least one header file that is used in the compilation of said DCOM Client application and a DCOM Server.

9. A data processing system according to claim 5 wherein said set of MIDL output files includes a Dynamic Data Link (DDL) data file which provides entry point information to a proxy function and a stub function.

10. A data processing system according to claim 3 wherein said set of source files includes function files which are module source files for a DCOM Server application.

11. A data processing system according to claim 10 wherein there is one said function file for each unique combination of Open/OLTP service name, input view buffer, and output view buffer.

12. A data processing system according to claim 3 wherein inputs used to generate said source files include a function template, Open/OLTP service names from an Open/OLTP application, said view files, a set of interface names and function names provided by the user, and a set of Universal Unique Identifiers (UUIDS) produced by a UUID generator in an Open/OLTP gateway.

13. A data processing system according to claim 3 wherein said type of client is a Visual Basic client.

14. A data processing system according to claim 3 wherein said type of client is a C++ application client.

15. A data processing system according to claim 3 wherein said type of client is a Web Browser with Active Server Pages (ASPs).

16. A data processing system according to claim 3 wherein a client application running within the DCOM environment includes a standard call to a DCOM Server application.

17. A data processing system according to claim 4 wherein said enterprise OLTP system is a Unisys 2200 series mainframe computer.

18. An apparatus for the automated development of a set of functions which allow an application residing within a Distributed Component Object Module (DCOM) environment to access an associated service located on an enterprise On-Line Transaction Processing (OLTP) system having:

at least one view file residing on said enterprise OLTP system which defines how parameters will be provided to and received from said OLTP system;

a file transfer mechanism to move said view file from said OLTP system to said DCOM environment;

an automated development utility which will operate on said view file to produce at least one output source file used in the creation of DCOM Client/Server applications; and wherein said automated development utility will query a user about a type of client that will be using said source files, thereby allowing said output source files to be specifically tailored to receive requests from the type of client specified by the user.

19. An apparatus according to claim 18 wherein said output source files include Interface Definition Language (IDL) files which define the interface for a DCOM Client application.

20. An apparatus according to claim 19 wherein said IDL files are compiled by a Microsoft Interface Definition Language (MIDL) compiler, which produces a set of MIDL output files.

21. An apparatus according to claim 20 wherein said set of MIDL output files includes at least one proxy/stub source file that has a proxy function for use with said DCOM Client application, and a stub function for use with a DCOM Server.

22. An apparatus according to claim 20 wherein said set of MIDL output files includes an interface Universal Unique Identifier (UUID) source file which provides UUIDs for said DCOM Client application.

23. An apparatus according to claim 20 wherein said set of MIDL output files includes at least one header file that is used in the compilation of said DCOM Client application and a DCOM Server.

24. An apparatus according to claim 20 wherein said set of MIDL output files includes a Dynamic Data Link (DDL) data file which provides entry point information to a proxy function and a stub function.

25. An apparatus according to claim 19 wherein said output source files includes function files which are module source files for a DCOM Server application.

26. An apparatus according to claim 19 wherein inputs used to generate said output source files include a function template, Open/OLTP service names from an Open/OLTP application, said view file, a set of interface names and functions provided by the user through the query, and a set of Universal Unique Identifiers (UUIDs) produced by a UUID generator in an Open/OLTP gateway.

27. In a data processing system having a Distributed Component Object Module (DCOM) environment connected to an enterprise On-line Transaction Processing (OLTP) system, a method for the interactive, simplified creation of functions needed to access OLTP services from a DCOM Client application, comprising the steps of:

creating a service on said OLTP system, including the creation of service input and output view files;

transferring said service input and output files from said OLTP system to said DCOM environment such that said service input and output view files can be accessed by a function builder utility;

reading said service input and output view files and extracting interface information from said service input and output view files via said function builder utility;

generating a set of source files that are compatible with said DCOM environment via said function builder utility;

building a DCOM client application within the DCOM environment which includes standard calls to said source files generated by said function builder utility; and compiling a set of IDL source files generated by said function builder utility with a Microsoft Interface Definition Language (MIDL) compiler, such that a set of MIDL output files is created.

28. A method according to claim 27 wherein said set of MIDL output files includes a proxy/stub source file that includes a proxy function for the DCOM Client application and a stub function for a DCOM Server.

29. A method according to claim 27 wherein said set of MIDL output files includes an interface Universal Unique Identifier (UUID) source file that provides UUIDs for said DCOM client application.

30. A method according to claim 27 wherein said set of MIDL output files includes a header file that is used in the compilation of said DCOM client application and server source code.

31. A method according to claim 27 wherein said set of MIDL output files include a Dynamic Link Library (DLL) data file that provides entry point information to a proxy/stub function.

* * * * *

UNITED STATES PATENT AND TRADEMARK OFFICE
CERTIFICATE OF CORRECTION

PATENT NO. : 6,324,681 B1  Page 1 of 1
DATED : November 27, 2001
INVENTOR(S) : Sebesta et al.

It is certified that error appears in the above-identified patent and that said Letters Patent is hereby corrected as shown below:

<u>Column 11,</u>
Line 48, change "4" to -- 1 --.

Signed and Sealed this

Seventeenth Day of September, 2002

Attest:

Attesting Officer

JAMES E. ROGAN
*Director of the United States Patent and Trademark Office*